Jan. 16, 1962 R. F. SCHLITZKUS 3,016,579
METHOD OF MOLDING INDICIA WHEELS
Filed Dec. 27, 1957 3 Sheets-Sheet 1

INVENTOR.
ROBERT F. SCHLITZKUS
BY
Clarence W. Martin
AGENT

Jan. 16, 1962   R. F. SCHLITZKUS   3,016,579
METHOD OF MOLDING INDICIA WHEELS
Filed Dec. 27, 1957   3 Sheets-Sheet 2
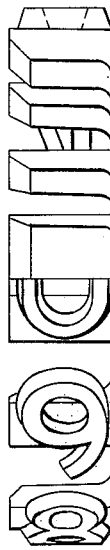
fig_3
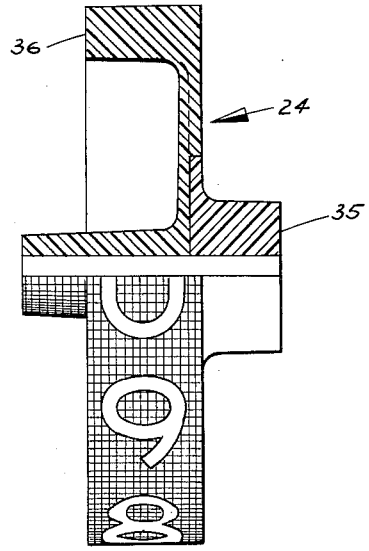
fig_5
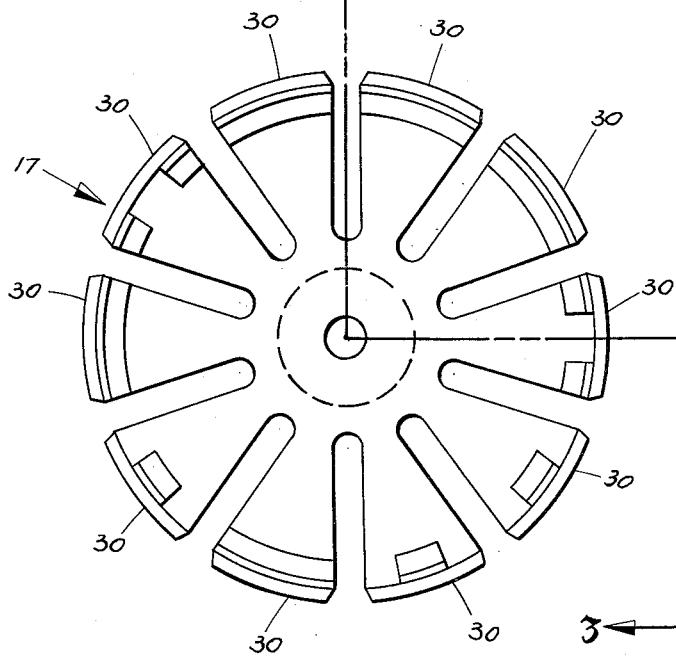
fig_4
INVENTOR.
ROBERT F. SCHLITZKUS
BY
Clarence W Martin
AGENT Jan. 16, 1962  R. F. SCHLITZKUS  3,016,579
METHOD OF MOLDING INDICIA WHEELS
Filed Dec. 27, 1957  3 Sheets-Sheet 3

INVENTOR.
ROBERT F. SCHLITZKUS
BY
Clarence W. Martin
AGENT

3,016,579
METHOD OF MOLDING INDICIA WHEELS
Robert Frederick Schlitzkus, Oakland, Calif., assignor to Smith-Corona Marchant Inc., a corporation of New York
Filed Dec. 27, 1957, Ser. No. 705,665
4 Claims. (Cl. 18—59)

The invention relates to improved indicia wheels and apparatus and methods for producing such wheels.

A known method of producing an indicia wheel comprises a two-step process in which the characters are recessed in the solid rim of a first casting and subsequently filled with a contrasting material. A major difficulty encountered in this method is that in making the first casting a mold comprising a plurality of radially withdrawable parts must be used to permit removal of the casting from the mold. Another method is known in which the characters are recessed in a strip of material which is inserted in the mold cavity and then the numeral wheel is completed by a second pouring which fills the recesses as well as completes the remainder of the numeral wheel. This method requires manual loading of each cavity of the mold which is cumbersome and expensive.

According to the invention, a wheel is made with a plurality of axially flexible spokes carrying on their ends indicia which may be formed by raised or depressed features of a unitary mold. The wheel is axially withdrawn from the unitary mold whereby the axial flexibility of the spokes permits radial withdrawal of the indicia. Thereafter, the spokes spring back and the wheel may be subjected to further operations as desired.

An object of the invention is to produce an improved indicia wheel.

Another object of the invention is to make a wheel having indicia in relief on its periphery in such a manner that the wheel may be axially removed from a unitary forming device.

Another object of the invention is to produce a wheel with color-contrasted indicia on the rim thereof which wheel may be entirely produced in unitary forming devices.

The invention may be practiced in any process by which a selected material is formed into a wheel with indicia formed by undercutting either of the numeral background or the numerals themselves on the peripheral surface thereof, providing that the resiliency of the material as formed permits deflection of at least one peripheral segment of the wheel to allow withdrawal of the wheel from the indicia forming device.

In order that the invention may be practiced readily by others, it will be described in terms of an express embodiment, given by way of illustration only, and with reference to the accompanying drawing in which:

FIG. 3 is a front view, partially in section, of the first casting of the wheel taken along line 3—3 of FIG. 4;

FIG. 4 is a left side view of the first casting of the wheel;

FIG. 5 is a front view, partially in section, of the wheel after the second casting;

Figure 1:
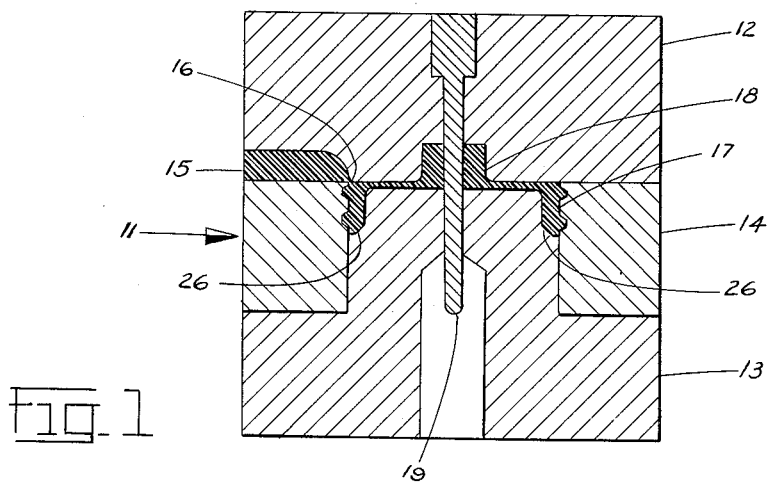
FIG. 1 is a sectional view of the mold used in the first casting of a numeral wheel.

Referring now to FIG. 1, a mold 11 for making a numeral wheel according to the invention comprises an upper portion 12, a lower portion 13, and a numeral forming portion 14. Plastic material enters the mold through a sprue 15 and passes through a gate 16 to form a first casting 17 (see FIG. 3) of a numeral wheel, including a hub 18 and having the peripheral surface divided into radial segments upon which the numerals are formed. A hole through the wheel hub is formed by casting around a pin 19 ((FIG. 1). After the hardening of the plastic material to form the casting 17, the lower portion 13 of the mold 11 is removed. Removal of the lower portion 13 allows the individual segments of the casting 17 to be deflected to free the numerals from the recesses of the numeral forming portion 14 of the mold 11. The casting 17 is removed from the numeral forming portion 14 by the application to the numeral forming portion 14 of a force downward with respect to the upper portion 12. It will be noted that the segment, as molded, derives planar stability (against radial compression) from the character of the material used and extraplanar flexibility (axial deflections) from its relative thinness. The axial flexing permits the radial withdrawal of the indicia from the undercut portions of the mold. If desired, the casting may then be removed from the upper portion 12. However, the upper portion 12 can be used in the subsequent filling of the wheel periphery with a second material, in which event the casting 17 need not be removed from the upper portion 12.

Figure 2:
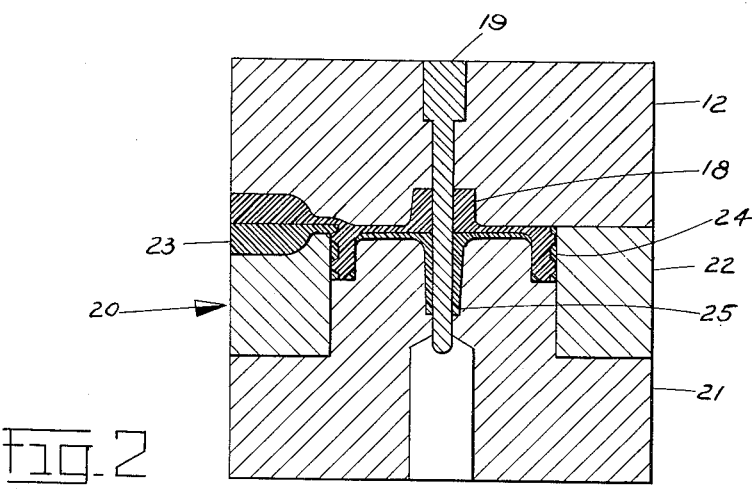
FIG. 2 is a sectional view of the mold used in the second casting of the wheel.

Referring now to FIG. 2, a mold 20 for filling the undercut peripheral surface of the casting 17 comprises a lower portion 21, a body portion 22, together with the previously mentioned upper mold portion 12. Plastic material injected through a second mold sprue 23 flows around the numerals on the periphery and in the spaces between the radial segments of the first casting 17, thus forming a solid wheel 24, including a hub 25 thereon. The numeral wheel may then be removed from the second mold 20 in the conventional manner, as there are now no undercuts remaining on the peripheral surface of the wheel 24.

It is to be noted that the lower inside periphery of the first casting 17 has beveled edges 26 (see FIG. 1). These edges insure that the first casting 17 is brought in close proximity to the lower portion 21 (FIG. 2) and the body portion 22 through the outward pressure exerted on the first casting 17 by the lower mold portion 22. It has been found that close proximity of the indicia of the first casting 17 to the sides of the body portion 22 is desirable in order to prevent flashing of the filling material over the outer surfaces of the indicia.

The completed wheel 24 is shown in FIG. 2 with a first casting hub 18 and a second casting hub 25 for purposes of illustration only. The wheel hub, if required, may, alternatively, be cast during either casting process. Optionally, gear teeth may be cast in place of or in addition to the hub 18 or the hub 25 during the respective castings.

Figure 6:
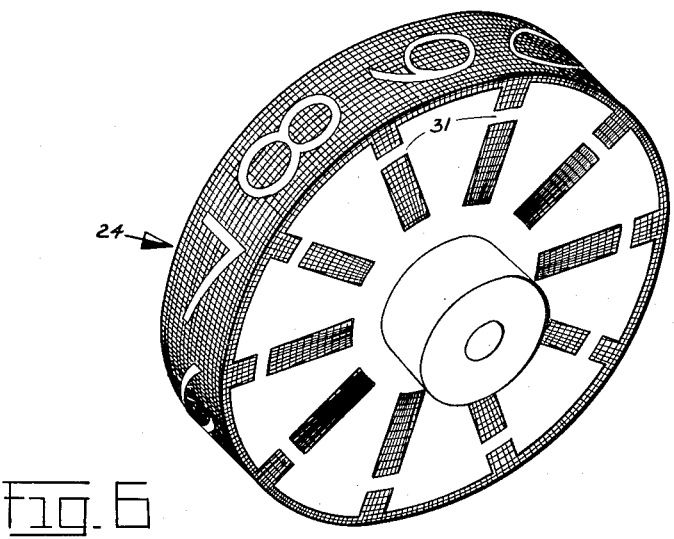
FIG. 6 is a projection of a completed numeral wheel.

As a safeguard against the possibility of washing, that is, the squeezing together of segments to cause unequal spacing between indicia, a thin webbing 31 (FIG. 6) joining the segments may be formed around or near the upper edge of the periphery of the first casting 17 during the first molding process. Such a webbing does not obstruct the deflection of the peripheral segments required to remove the casting 17 from the mold 11, and at the same time prevents washing.

Referring now to FIG. 3, there is shown a front view, including a partial section, of the first casting 17. The manner in which indicia having cut out portions are formed during the first casting may be illustrated by the numeral "9." Thus, a hole in the upper portion of the numeral "9" permits filling the closed loop during the second casting while a cross piece supports the center of the numeral, leaving an opening into which plastic may flow to fill the figure.

Referring now to FIG. 4, there is shown the division of the wheel 17 into radial segments 30, each of which carries a single numeral. The spaces between the radial segments 30 facilitate withdrawal of the body mold 14 as was described in connection with FIG. 1.

Referring now to FIG. 5, a front view is shown, partially in section, of the finished numeral wheel 24. The partial section is taken through the filled portion between adjacent segments, illustrating the manner in which the flow of material around the wheel 17 and into the spaces between the segments 30 during the second casting process forms a complete and continuous shell. The shaded portion 35 indicates the material of the first casting. The shaded portion 36 indicates the material of the second casting.

Figure 7:
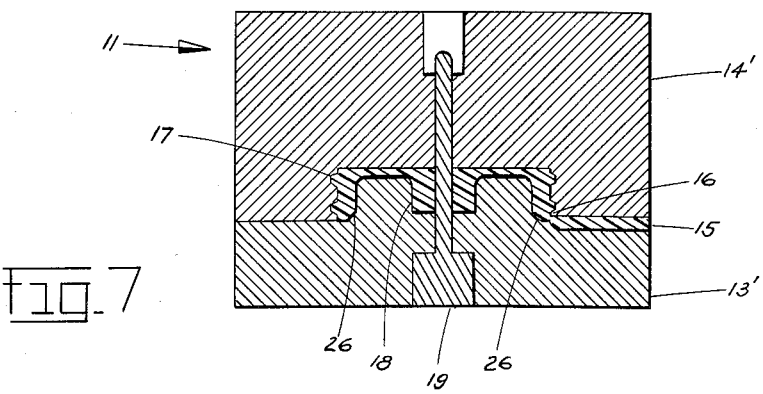
FIG. 7 is a sectional view of an alternate embodiment of the invention.

Referring now to FIG. 7, there is shown an alternative embodiment of the invention utilizing a two-part mold. The mold 11 consists of a lower portion 13' and a numeral forming portion 14'. The casting 17 may be removed from the mold 11 by withdrawing the lower portion 13' and exerting a downward pressure on the sprue 15.

The foregoing description has referred to practice of the invention by use of a mold and plastic material. However, it is to be understood that any material possessing the property of resiliency when so formed by molding, stamping, or any other process, may be utilized to practice the invention.

The invention claimed is:

1. A process of making an indicia wheel comprising the steps of: applying a resilient material to a cavity bounded by a top mold, an inner mold and an undercut circumferential mold, said cavity forming the material into indicium separate from one another with thin resilient members interconnecting the indicium, each of said indicium having an edge connected to an outer end of a resilient member and being molded on the undercut surface of the circumferential mold, which surface lies in a plane transverse to the plane in which the members lie so that all portions of each of the molded indicium can be freely deflected inwardly towards the central axis of the mold; removing the inner mold to thereby leave a space for inward deflection of the material; and applying a force in an axial direction to the material to cause the indicium and resilient members to deflect inwardly into said space, said force causing the indicium to slide over the undercut portions of the circumferential mold, the material thereby being removed undeformed from the circumferential mold.

2. A process of making an indicia wheel comprising the steps of: injecting into a cavity a hot soft material which becomes hard and resilient when solidified, said cavity being bounded by a top mold, an inner mold and an undercut circumferential mold, said cavity forming the material into indicium separate from one another with thin resilient members interconnecting the indicium, each of said indicium having an edge connected to an outer end of a resilient member and being molded on the undercut surface of the circumferential mold, which surface lies in a plane transverse to the plane in which the members lie so that all portions of each of the indicium can be freely deflected inwardly towards the central axis of the mold; cooling the injected material until solidified; removing the inner mold to thereby leave a space for inward deflection of the material; and applying a force in an axial direction to the material to cause the indicium and resilient member to deflect inwardly into said space, said force causing the indicium to slide over the undercut portions of the circumferential mold, and the material thereby being removed undeformed from the circumferential mold.

3. A process of making an indicia wheel comprising the steps of: applying a resilient material to a first mold to form indicium separate from one another with thin resilient members interconnecting the indicium, each of said indicium having an edge connected to an outer end of a resilient member and being molded on an undercut surface which lies in a plane transverse to the plane in which the members lie so that all portions of each of the indicium can be freely deflected inwardly towards the central axis of the mold; applying a force in an axial direction to the material to cause the indicium and the resilient members to deflect towards the axis away from the undercut portion of the mold to permit removal of the material from the mold; placing the resilient material removed from the first mold into a second mold; and applying another material contrasting with the material of the indicium to the second mold to fill in the spaces between the indicium and openings in the indicium to form the rim of the wheel.

4. A process of making an indicia wheel as defined in claim 3 including the additional step of forming a locating characteristic in the configuration of said wheel.

References Cited in the file of this patent

UNITED STATES PATENTS

| | | |
|---|---|---|
| Re. 19,000 | Schribner | Nov. 14, 1933 |
| 1,547,643 | Clapp | July 28, 1925 |
| 2,242,699 | Flader | May 20, 1941 |
| 2,266,432 | Morin et al. | Dec. 16, 1941 |
| 2,279,337 | Niemann | Apr. 14, 1942 |
| 2,288,187 | Gits et al. | June 30, 1942 |
| 2,327,665 | Peat | Aug. 24, 1943 |
| 2,396,406 | Anderson | Mar. 12, 1946 |
| 2,500,494 | Jeffers | Mar. 14, 1950 |
| 2,544,140 | Dofsen et al. | Mar. 6, 1951 |
| 2,762,080 | Heinze et al. | Sept. 11, 1956 |
| 2,815,534 | Ising | Dec. 10, 1957 |
| 2,899,705 | Darlington | Aug. 18, 1959 |

FOREIGN PATENTS

| | | |
|---|---|---|
| 606,972 | Great Britain | Aug. 24, 1948 |